E. H. STUDEBAKER.
STALK PULLER.
APPLICATION FILED AUG. 12, 1913.
1,131,290.
Patented Mar. 9, 1915.
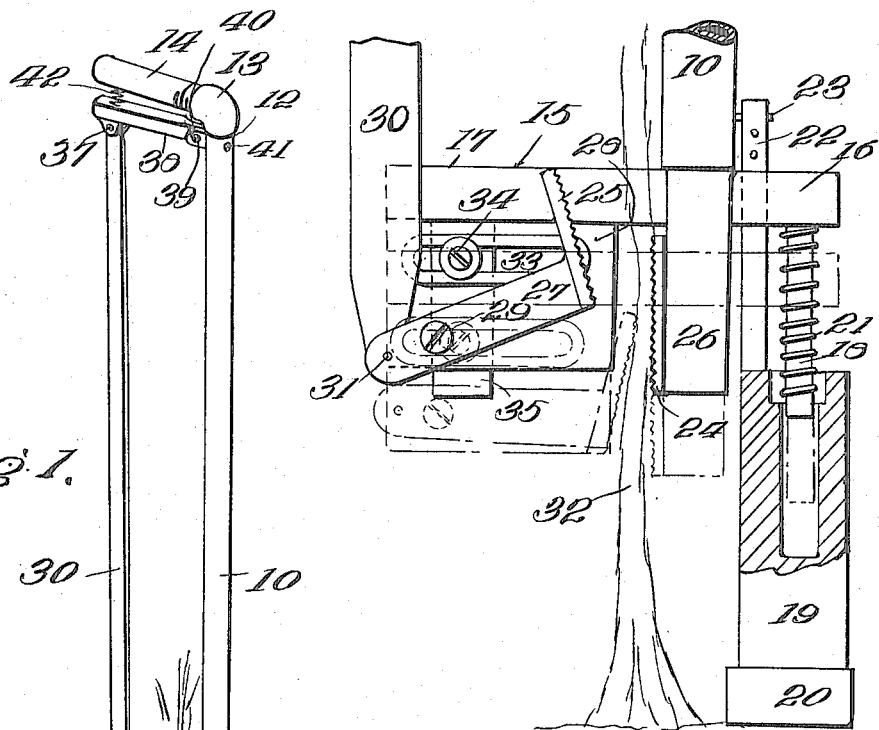
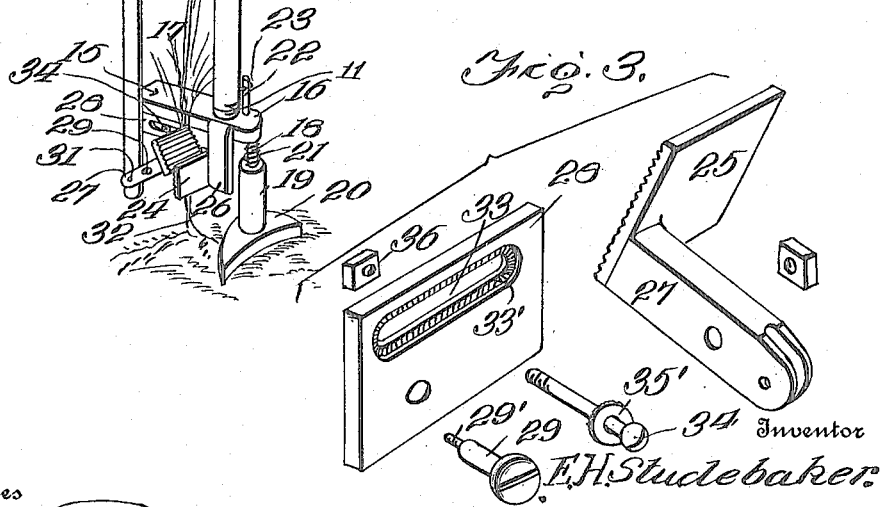

UNITED STATES PATENT OFFICE.

ENOCH H. STUDEBAKER, OF WAVERLY, VIRGINIA, ASSIGNOR OF ONE-HALF TO JOHN L. BIRDSONG, OF KENBRIDGE, VIRGINIA.

STALK-PULLER.

1,131,290.  Specification of Letters Patent.  Patented Mar. 9, 1915.

Application filed August 12, 1913. Serial No. 784,462.

*To all whom it may concern:*

Be it known that I, ENOCH H. STUDEBAKER, citizen of the United States, residing at Waverly, in the county of Sussex and State of Virginia, have invented certain new and useful Improvements in Stalk-Pullers, of which the following is a specification.

The subject-matter of the present invention relates broadly to agricultural implements, and is directed particularly to the provision of a mechanical device for thinning corn, beets and the like.

It is a fact well recognized among farmers that the present method of thinning corn by hand is not only a very tedious and arduous task, involving waste of time and labor, but is also productive of a great deal of waste in that the stalks in many hills of corn are blighted in their growth as a result of the loosening of the earth around their roots which occurs when the superfluous stalks are pulled out of the ground.

As its principal object, therefore, this invention aims to provide a manually operable corn thinner which will automatically operate to tamp or pack the earth around each corn hill simultaneously with the removal of the superfluous stalks.

An object of equal importance with the foregoing is to provide a stalk gripping device consisting of a fixed jaw and a movable jaw, the movable jaw being mounted for adjustment toward and away from the fixed jaw, so that various sizes of stalks may be accommodated.

A further object resides in the provision of a spring-pressed tamping foot which will automatically pack the earth surrounding the corn hill, simultaneously with the elevation of the stalk gripping jaws during the operation of removing superfluous stalks from the hill.

An object coincident with the above is to provide means whereby the spring which actuates the tamping foot may be readily and conveniently adjusted with respect to its normal tension.

A further object is to construct the device with such regard to proportion, number and arrangement of parts that it may be cheaply manufactured, will be durable and efficient in its action, and may be conveniently and efficiently employed in removing superfluous stalks from the corn hills whether the ground be rough and uneven, rocky or otherwise.

A still further object is to operatively connect the stalk gripping jaws with a manual control operable from the handle of the implement, and to provide a spring for normally holding the jaws in open receiving position, so that the user of the device may manipulate it while walking, and without bending over.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts, Figure 1 is a perspective view illustrating the gripping jaws in engagement with a stalk of corn; Fig. 2 is a front elevation disclosing in detail the manner in which the tamping foot and stalk gripping jaws are operated; Fig. 3 is a detail view of the movable gripping jaw and its adjustable plate to which it is pivotally attached for adjustment toward and away from the fixed jaw.

Before proceeding to the description of the drawings, it is desirable to emphasize the fact that while the device of the present invention has been designed with particular reference to the thinning of corn has been illustrated, and will be hereinafter described in that connection, it may, nevertheless, be employed with equal efficiency for thinning radishes, beets and any other vegetables or grains which are commonly sown in rows and subsequently thinned out to leave only the hardiest stalks for maturing.

Coming now to the description of the drawings, the preferred embodiment of this invention includes a body or handle, a spring-pressed tamping foot carried thereby, a pair of coacting stalk gripping jaws, and an operating lever connected to the jaws and adapted to be manipulated from the end of the handle. Taking up these elements in the order named, the handle or body portion of the implement, designated by the numeral 10, consists essentially in a length of ordinary gas pipe, which is threaded at each terminal as at 11 and 12 and is of such length that it will, when in vertical position, extend from the ground to the waist of an average person. Relative to the preferred length of the handle 10, it is obvious that the device may be made in various sizes, to adapt it for use by children or adults. The upper end of the member 10 terminates in a threaded elbow 13, extending from which is a short pipe section 14 which serves as a hand grip for the operator of the implement. The lower threaded terminal 11 of the member 10 carries a removable head bar 15 which is substantially rectangular in conformation and is disposed in a plane parallel to the longitudinal axis of the member 14. The terminal 11 of the member 10 is threaded into an aperture formed in the member 15 adjacent one terminal thereof, thus producing in substance a short arm 16 and a long arm 17. To the short arm 16 is secured a downwardly extending rod 18 which is mounted for movement in the barrel 19 of the tamping foot 20. This tamping foot 20 is preferably formed in the nature of a crescent-shaped plate, and the barrel 19 extends vertically and upwardly therefrom. The interior diameter of the member 19 is sufficient to accommodate both the guide rod 18 and a helical spring 21. This spring is of the expansion type, and normally holds the barrel 19 spaced from the short arm 16 of the head 15. As a means for limiting the spacement of the member 19 from the arm 16, there has been provided a rod 22 which extends from the upper edge of the barrel 19 and operates through a vertical bore formed in the member 16, being provided adjacent its upper terminal with a number of spaced apertures which extend in a longitudinal series and are designed to receive a cotter pin or similar device 23 which, as will be obvious, limits the downward movement of the member 22 by engagement with the upper face of the short arm 16. Relative to the formation of the tamping foot 20, it is to be noted that by imparting a crescent-like conformation to this member, it may be readily inserted between closely disposed corn without likelihood of injury, since each end of the tamping foot is pointed, as will be readily understood upon reference to Fig. 1 particularly. At this point, it is desirable to direct attention to the fact that by providing a pair of rods, as at 18 and 22, the liability of the barrel 19 to lateral displacement is effectually guarded against, and the efficiency of this tamping element of the invention materially increased.

Proceeding now to the description of the adjustable jaw device, which is operated to grip the stalks, it will be noted upon reference to the drawings that this feature of the invention includes a fixed jaw 24 and a movable jaw 25. The fixed jaw 24 is, in the preferred embodiment, a metallic plate, the inwardly disposed face of which is serrated to produce gripping teeth. This plate is bolted or otherwise secured to a dependent bracket plate 26 which is suitably secured to the forward longitudinal edge of the member 15. The movable jaw 25 includes a plate element which is substantially similar to the member 24, and is carried on the free terminal of a pivoted link 27. This link member 27 is pivoted intermediate its length to a plate 28, as at 29, being connected terminally to a link lever 30 by a pivot pin 31. It has been found expedient in practice to make the major portion of the bolt 29 smooth and to form a reduced threaded shank on the smooth portion, so that a shoulder is formed on the bolt as indicated at 29'. It will be obvious that by threading the reduced shank of this bolt 29 into the threaded bore provided in the plate 28 the engagement of the shoulder 29' with the face of the plate will limit the space comprehended between the head of the bolt and the plate, so that the link 27 will be allowed to swing freely at all times without liability of binding engagement with either the bolt head or the plate 28. Upon reference to Figs. 1 and 2 particularly, it will be noted that the gripping plate 25 is disposed at an angle to the longitudinal axis of the link 27 to which it is terminally secured, so that when the link 27 is operated to bring the member 25 into gripping relation to the fixed jaw plate 24, there will be a severe gripping of the stalk, illustrated conventionally at 32.

In order to accommodate stalks of various diameters, the plate 28 has been mounted for horizontal adjustment, so that the jaw 25 may be adjusted for various degrees of spacement from the fixed jaw 24. To this end, the plate 28 has been formed with a horizontal slot 33 through which a bolt 34 carried by a dependent arm 35 is passed. This bolt 34 carries a washer 35', the inner face of which is serrated as indicated in Fig. 3, so that it will severely engage the serrations 33' formed around the edge of the slot 33, thus effectually preventing accidental shifting of the bolt 34 through the slot. It will be obvious that the plate 28 may be held in various adjusted positions by manipulation of the nut 36 which is threaded on the bolt 34 and engages the face of the bracket arm 35 opposite from the plate 28. As previously set forth, the movable jaw link 27 is pivoted to the lower terminal of the link lever 30. This member 30 is pivoted at its upper terminal, as at 37, to an operating lever 38, the inner terminal of which is pivotally connected as at 39 to a terminally apertured bracket 40. This member 40 is formed with a threaded shank 41 which is threaded in a transverse bore formed in the member 10 adjacent its upper terminal. As a means for normally spacing the member 38 from the hand grip 14 and, consequently, holding the movable jaw 25 in open receiving position, there has been provided a helical spring 42 which is of the expansion type and operates in an obvious manner.

From the foregoing, the operation of the device will be apparent. The operator passes the presser foot 20 between the stalks of corn, and brings the fixed and movable jaw members on opposite sides of the stalk to be pulled up. The jaws are then brought into gripping relation by pressing the member 38 toward the hand grip 14, against the tension of the spring 42. Previous to this operation, the handle 10 has been pressed downwardly against the tension of the spring 21 to bring the short arm 16 in engagement with the upper edge of the barrel 19. It will, therefore, be seen that when the operator lifts the handle 10 to pull the stalk of corn out of the ground, the spring 21 will tend to hold the presser foot 20 against the earth, thus preventing the roots of the remaining stalks of corn from being exposed to the air. Relative to this operation, it is to be noted that if the operator pulls the handle 10 up quickly, the spring 21 will project the foot 20 downwardly with rapidity, and that the foot will strike against the ground with considerable force, thus tamping and packing the earth.

In reduction to practice, I have found that the form of my invention, illustrated in the drawings and referred to in the above description as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What I claim is:—

1. In a device of the character described, a body member, a pair of coacting gripping jaws, and a spring-pressed tamping member.

2. In a device of the character described, a body member, a spring-pressed tamping foot carried thereby, a pair of co-acting gripping jaws normally held in open position, and means for moving the jaws into gripping relation.

3. In a device of the character described, a body member, a head member movably attached thereto, a spring-pressed tamping foot mounted on the head member, a pair of co-acting gripping jaws carried by the head member and normally disposed in open position, and means for moving the jaws into gripping relation.

4. In a device of the character described, a body member, a spring pressed tamping foot carried thereby, a pair of co-acting gripping jaws mounted on the head member, said tamping foot being adapted to automatically and simultaneously move downwardly upon the forward movement of the body member.

5. In a device of the character described, a body member, a spring-pressed tamping foot, and a pair of co-acting gripping jaws, the first of said jaws being fixedly mounted and the second of said jaws being pivotally mounted, and means for varying the normal space comprehended between the jaws when in open position.

6. In a device of the character described, a body member, a spring-pressed tamping foot, a fixed gripping jaw, a movable gripping jaw, means for adjusting the space comprehended between the fixed and movable jaws when in open position, and means for moving the said movable jaw into gripping relation with the said fixed jaw.

7. In a device of the character described, a body member, a head detachably mounted thereon, a spring-pressed tamping foot carried by the head, a fixed jaw carried by the head, a plate adjustably secured to the head and adapted for longitudinal adjustment with respect thereto, a link pivoted to said plate, a movable jaw secured terminally to said link, and means for operating said movable jaw.

8. In a device of the character described, a handle, a head member detachably mounted at the lower terminal thereof, a spring-pressed tamping foot carried adjacent one terminal of the head member, a fixed jaw carried by the head member, a plate detachably secured to the head member and adapted for longitudinal adjustment with respect thereto, a link pivoted to said plate, a movable jaw carried terminally of the link and having its gripping face inclined to the longitudinal axis thereof, and manually operable means for swinging the movable jaw into gripping relation with the fixed jaw.

9. In a device of the character described, a handle member, a head detachably secured to one terminal thereof, a spring-pressed tamping foot carried by the head member, a fixed jaw carried by the head member, a pivotally mounted jaw co-acting with the fixed jaw, and adjustable longitudinally of the head member, and means for moving the movable jaw into gripping engagement with the fixed jaw, said means being adapted to normally hold the movable jaw in spaced relation to the fixed jaw.

10. In a device of the character described, a handle member, a head detachably secured to one terminal thereof, a pair of co-acting gripping jaws carried by the head member, means for operating the said jaws, and a spring-pressed tamping foot carried by the head member and adapted to be held in engagement with the ground during the application of the gripping jaws, said tamping foot being adapted to bear against the ground during the upward movement of the handle.

11. In a device of the character described, a body member, a head detachably carried thereby, a fixed jaw secured to the head, a longitudinally adjustable plate mounted on the head, a movable jaw, a link pivotally connecting the movable jaw to the plate, and means for operating the movable jaw.

12. In a device of the character described, a body member, a head detachably carried thereby, a fixed jaw secured to the head, a longitudinally adjustable plate mounted on the head, a movable jaw, a link pivotally connecting the movable jaw to the plate, means for normally holding the movable jaw in spaced relation to the fixed jaw, and means for operating the movable jaw.

13. In a device of the character described, a body member, a fixed jaw, a movable jaw, means for adjusting the space between the fixed and movable jaws when said jaws are in gripping relation, and operating means for the movable jaw.

14. In a device of the character described, a body member, a pair of co-acting gripping jaws carried thereby, one of said jaws being fixed, the other of said jaws being movable, means for holding the movable jaw in adjusted position whereby the space normally comprehended between the fixed and movable jaws when in open position may be varied, said means also being adjustable for varying the space included between the jaws when in clamping relation, and operating means for the movable jaw.

In testimony whereof I affix my signature in presence of two witnesses.

ENOCH H. STUDEBAKER.

Witnesses:
W. B. BIRDSONG,
L. D. BIRDSONG.

Copies of this patent may be obtained for five cents each, by addressing the "Commissioner of Patents, Washington, D. C."